United States Patent
Sultenfuss et al.

(10) Patent No.: US 10,963,359 B2
(45) Date of Patent: Mar. 30, 2021

(54) BATTERY MANAGEMENT UNIT BASED RUNTIME MONITORING OF POWER CONSUMPTION

(71) Applicant: Dell Products L.P., Round Rock, TX (US)

(72) Inventors: Andrew Thomas Sultenfuss, Leander, TX (US); Richard Christopher Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 16/162,604

(22) Filed: Oct. 17, 2018

(65) Prior Publication Data
US 2020/0125467 A1   Apr. 23, 2020

(51) Int. Cl.
| | | |
|---|---|---|
| *G06F 11/30* | (2006.01) | |
| *G06F 9/38* | (2018.01) | |
| *G06F 1/3212* | (2019.01) | |
| *G06F 11/34* | (2006.01) | |

(52) U.S. Cl.
CPC ........ *G06F 11/3062* (2013.01); *G06F 1/3212* (2013.01); *G06F 9/3865* (2013.01); *G06F 11/3476* (2013.01)

(58) Field of Classification Search
CPC ...... G06F 1/3203; G06F 1/3212; G06F 1/325; G06F 1/329; G06F 1/3287; G06F 1/266; G06F 1/3206; G06F 11/3409; G06F 11/3419; G06F 11/3466
USPC .................. 713/340, 300, 320, 321
See application file for complete search history.

(56) References Cited

U.S. PATENT DOCUMENTS

| | | | | |
|---|---|---|---|---|
| 2007/0049133 A1* | 3/2007 | Conroy | ................. | G06F 1/3203 439/894 |
| 2008/0225829 A1* | 9/2008 | Sachs | .................... | H04W 48/18 370/351 |
| 2010/0026306 A1* | 2/2010 | Zhang | ................ | G01R 31/3647 324/426 |
| 2010/0275047 A1* | 10/2010 | Kaneko | ................. | G06F 1/3203 713/323 |

(Continued)

OTHER PUBLICATIONS 6 to 10-Series Cell Li-Ion and Li-Phosphate Battery Monitor (bq76940 Family), Retrieved from url: http://www.ti.com/product/BQ76930; 2 pages, 2018.

*Primary Examiner* — Faisal M Zaman
(74) *Attorney, Agent, or Firm* — Baker Botts L.L.P.

(57) ABSTRACT

An information handling system (IHS) includes a battery management unit (BMU) and an embedded controller (EC). The EC is operable for detecting a trigger for monitoring power consumption in light of a first condition, capturing a state of the IHS, writing data representing the state to a power profile log, annotating the log with an identifier of a point at which logging associated with the first condition begins, obtaining, from the BMU, power data representing an amount of current flowing from or charge delivered by a battery, writing at least some power data to the log, detecting a trigger for ending monitoring associated with the first condition, annotating the log with an identifier of a point at which logging associated with the first condition ends, and generating, dependent on the annotations of the identifiers in the log, a power profile report indicating power consumption associated with the first condition.

12 Claims, 4 Drawing Sheets

(56) References Cited

U.S. PATENT DOCUMENTS

| | | | | |
|---|---|---|---|---|
| 2011/0040990 A1* | 2/2011 | Chan | H04M 1/72519 | 713/300 |
| 2011/0040996 A1* | 2/2011 | Hackborn | G06F 11/3409 | 713/340 |
| 2011/0231026 A1* | 9/2011 | Yaoyama | G03G 15/5004 | 700/291 |
| 2012/0317432 A1* | 12/2012 | Assad | G06F 1/329 | 713/340 |
| 2013/0232354 A1* | 9/2013 | Ono | G06F 1/32 | 713/320 |
| 2015/0127961 A1* | 5/2015 | Huang | H02J 7/0047 | 713/320 |
| 2015/0177814 A1* | 6/2015 | Bailey | G06F 1/28 | 713/320 |
| 2015/0338467 A1* | 11/2015 | Liu | H04W 52/0251 | 702/63 |
| 2016/0098337 A1* | 4/2016 | Ekambaram | H04L 67/025 | 719/318 |
| 2016/0360594 A1* | 12/2016 | Chemel | H05B 45/20 | |
| 2017/0018923 A1* | 1/2017 | Rombouts | G06Q 50/06 | |
| 2017/0285722 A1* | 10/2017 | Kim | G06F 1/329 | |
| 2018/0299944 A1* | 10/2018 | Liang | G06F 1/3287 | |
| 2019/0124424 A1* | 4/2019 | Torpy | H04Q 9/00 | |

* cited by examiner

BATTERY MANAGEMENT UNIT BASED RUNTIME MONITORING OF POWER CONSUMPTION

BACKGROUND

Field of the Disclosure

This disclosure relates generally to information handling systems and, more particularly, to battery management unit (BMU) based runtime monitoring of power consumption associated with particular system components, applications, and events.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as laptop computers, notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device.

Power characterization for an information handling system or for a specific application executing in an information handling system can be difficult. Some approaches involve the use of sensors on independent power lines. Other approaches involve the characterization of component power consumption. However, the power consumption can vary based on several factors, including production run, age, or workload. In some information handling systems, the number of possible combinations of hardware components from multiple vendors is large, making characterization of any particular configuration with its respective constituent components more complex.

SUMMARY

In one aspect, a disclosed information handling system includes a battery, a battery management unit that controls operation of the battery, and an embedded controller. The embedded controller includes a processor, and non-transitory computer readable memory media storing instructions executable by the processor for detecting a first trigger for monitoring power consumption in the information handling system in light of a first condition in the information handling system, capturing a first state of the information handling system, writing data representing the first state of the information handling system to a power profile log, annotating the power profile log with a first identifier of a point in the power profile log at which data logging associated with the first condition begins, obtaining, from the battery management unit, power data sampled by the battery management unit, including data representing an amount of current flowing out of the battery or an amount of charge delivered by the battery, writing at least a portion of the power data to the power profile log, detecting a second trigger for ending the monitoring of power consumption in the information handling system in light of the first condition, annotating the power profile log with a second identifier of a point in the power profile log at which data logging associated with the first condition ends, and generating, dependent on the annotations of the first and second identifiers in the power profile log, a first power profile report indicating power consumption associated with the first condition.

In any of the disclosed embodiments, the power data obtained from the battery management unit may be received from the battery management unit in real time as it is sampled by the battery management unit.

In any of the disclosed embodiments, the power data obtained from the battery management unit may include sampled power data that has been aggregated by the battery management unit.

In any of the disclosed embodiments, the first condition may include execution of a given program instruction in the information handling system, execution of a given program instruction in a system that is remote from the information handling system and is communicatively coupled to the information handling system, a flag being set by program instructions executing in the information handling system, a flag being set by program instructions executing in a system that is remote from the information handling system and is communicatively coupled to the information handling system, presence of a given component in the information handling system, presence of a given configuration of components in the information handling system, execution of a given version of a software image in the information handling system, or operation of the information handling system in a given operating mode.

In any of the disclosed embodiments, the data representing the first state of the information handling system may include one more of a respective identifier of each of one or more hardware or software components in the information handling system, a respective identifier of a vendor or supplier of each of one or more hardware or software components in the information handling system, a respective identifier of a model or version of each of one or more hardware or software components in the information handling system, data indicating a current status of the battery, and data indicating a current operating mode of the information handling system.

In any of the disclosed embodiments, the second trigger may include expiration of a timer, the first condition no longer being met, execution of a given program instruction in the information handling system, execution of a given program instruction in a system that is remote from the information handling system and is communicatively coupled to the information handling system, removal of a given component from the information handling system, a change in a configuration of components in the information handling system, or a change in an operating mode of the information handling system.

In any of the disclosed embodiments, the instructions may be further executable by the processor for detecting a third trigger for monitoring power consumption in the information handling system in light of a second condition in the information handling system, capturing a second state of the information handling system, writing data representing the second state of the information handling system to the power profile log, annotating the power profile log with a third identifier of a point in the power profile log at which data logging associated with the second condition begins, obtaining, from the battery management unit, power data sampled by the battery management unit, including data representing an amount of current flowing out of the battery or an amount of charge delivered by the battery, writing at least a portion of the power data to the power profile log, detecting a fourth trigger for ending the monitoring of power consumption in the information handling system in light of the second condition, annotating the power profile log with a fourth identifier of a point in the power profile log at which data logging associated with the second condition ends, and generating, dependent on the annotations of the third and fourth identifiers in the power profile log, a second power profile report indicating power consumption associated with the second condition.

In any of the disclosed embodiments, the third trigger may be detected prior to detection of the second trigger.

In any of the disclosed embodiments, the instructions may be further executable by the processor for, in response to detecting the second trigger, capturing a second state of the information handling system, and writing data representing the second state of the information handling system to the power profile log.

In any of the disclosed embodiments, the first power profile report may include a recommended action to be taken to reduce power consumption in the information handling system.

In another aspect, a disclosed method is for battery management unit based runtime monitoring of power consumption. The method includes detecting a first trigger for monitoring power consumption in an information handling system in light of a first condition in the information handling system, capturing a first state of the information handling system, writing data representing the first state of the information handling system to a power profile log, annotating the power profile log with an identifier of a point in the power profile log at which data logging associated with the first condition begins, obtaining, from a battery management unit that controls operation of a battery of the information handling system, power data sampled by the battery management unit, including data representing an amount of current flowing out of the battery or an amount of charge delivered by the battery, writing at least a portion of the power data to the power profile log, detecting a second trigger for ending the monitoring of power consumption in the information handling system in light of the first condition, annotating the power profile log with an identifier of a point in the power profile log at which data logging associated with the first condition ends, and generating, dependent on the annotations of the first and second identifiers in the power profile log, a first power profile report indicating power consumption associated with the first condition.

In any of the disclosed embodiments, obtaining the power data may include obtaining the power data from the battery management unit in real time as it is sampled by the battery management unit.

In any of the disclosed embodiments, the power data obtained from the battery management unit may include sampled power data that has been aggregated by the battery management unit.

In any of the disclosed embodiments, the first condition may include execution of a given program instruction in the information handling system, execution of a given program instruction in a system that is remote from the information handling system and is communicatively coupled to the information handling system, a flag being set by program instructions executing in the information handling system, a flag being set by program instructions executing in a system that is remote from the information handling system and is communicatively coupled to the information handling system, presence of a given component in the information handling system, presence of a given configuration of components in the information handling system, execution of a given version of a software image in the information handling system, or operation of the information handling system in a given operating mode.

In any of the disclosed embodiments, the second trigger may include expiration of a timer, the first condition no longer being met, execution of a given program instruction in the information handling system, execution of a given program instruction in a system that is remote from the information handling system and is communicatively coupled to the information handling system, removal of a given component from the information handling system, a change in a configuration of components in the information handling system, or a change in an operating mode of the information handling system.

In any of the disclosed embodiments, the method may further include detecting a third trigger for monitoring power consumption in the information handling system in light of a second condition in the information handling system, capturing a second state of the information handling system, writing data representing the second state of the information handling system to the power profile log, annotating the power profile log with a third identifier of a point in the power profile log at which data logging associated with the second condition begins, obtaining, from the battery management unit, power data sampled by the battery management unit, including data representing an amount of current flowing out of the battery or an amount of charge delivered by the battery, writing at least a portion of the power data to the power profile log, detecting a fourth trigger for ending the monitoring of power consumption in the information handling system in light of the second condition, annotating the power profile log with a fourth identifier of a point in the power profile log at which data logging associated with the second condition ends, and generating, dependent on the annotations of the third and fourth identifiers in the power profile log, a second power profile report indicating power consumption associated with the second condition.

In any of the disclosed embodiments, the third trigger may be detected prior to detection of the second trigger.

In yet another aspect, a disclosed on-transitory computer readable memory media stores instructions executable by a processor for detecting a first trigger for monitoring power consumption in an information handling system in light of a first condition in the information handling system, capturing a first state of the information handling system, writing data representing the first state of the information handling system to a power profile log, annotating the power profile log with a first identifier of a point in the power profile log at which data logging associated with the first condition begins, obtaining, from a battery management unit that controls operation of a battery of the information handling system, power data sampled by the battery management unit, including data representing an amount of current flowing out of the battery or an amount of charge delivered by the battery, writing at least a portion of the power data to the power profile log, detecting a second trigger for ending the monitoring of power consumption in the information handling system in light of the first condition, annotating the power profile log with a second identifier of a point in the power profile log at which data logging associated with the first condition ends, and generating, dependent on the annotations of the first and second identifiers in the power profile log, a first power profile report indicating power consumption associated with the first condition.

In any of the disclosed embodiments, the first condition may include, execution of a given program instruction in the information handling system, execution of a given program instruction in a system that is remote from the information handling system and is communicatively coupled to the information handling system, a flag being set by program instructions executing in the information handling system, a flag being set by program instructions executing in a system that is remote from the information handling system and is communicatively coupled to the information handling system, presence of a given component in the information handling system, presence of a given configuration of components in the information handling system, execution of a given version of a software image in the information handling system, or operation of the information handling system in a given operating mode.

In any of the disclosed embodiments, the second trigger may include expiration of a timer, the first condition no longer being met, execution of a given program instruction in the information handling system, execution of a given program instruction in a system that is remote from the information handling system and is communicatively coupled to the information handling system, removal of a given component from the information handling system, a change in a configuration of components in the information handling system, or a change in an operating mode of the information handling system.

BRIEF DESCRIPTION OF THE DRAWINGS

For a more complete understanding of the present invention and its features and advantages, reference is now made to the following description, taken in conjunction with the accompanying drawings, in which.

Figure 1:
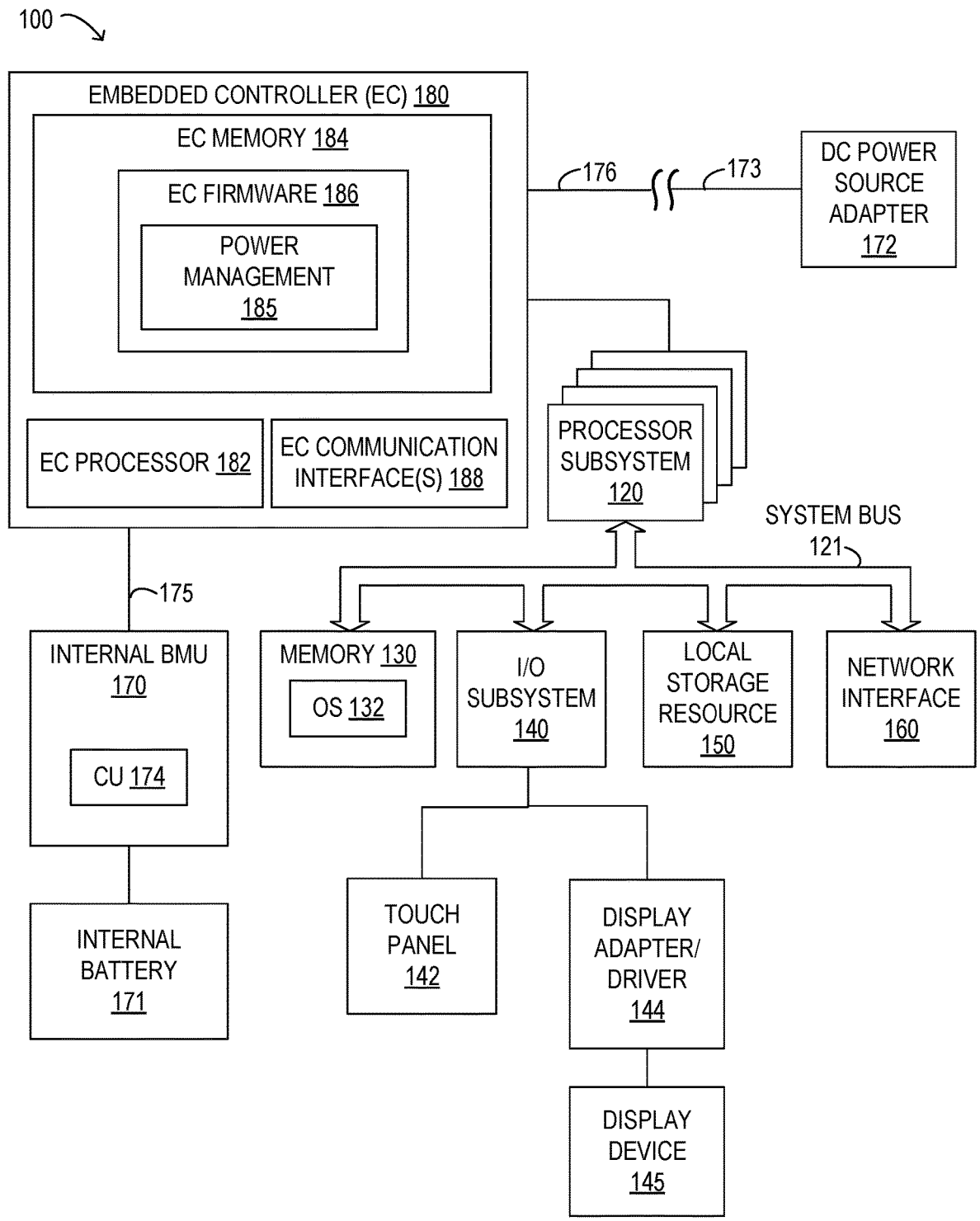
FIG. 1 is a block diagram of selected elements of an embodiment of an information handling system.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Information handling systems may include a variety of hardware and software components as well as combinations of hardware and software components. For example, particular computing platforms may include a fixed collection of hardware and software components, but these components may vary in terms of manufacturer, supplier, version, age, or other parameters that may potentially affect power consumption in any given instance of the computing platform. These and other factors may result in a large variance in runtime and/or power consumption in a particular information handling system, making it difficult to determine any incremental power consumption that is associated with particular executing applications, events, or other permanent or temporary conditions in the information handling system. Factors that may complicate a determination of power consumption associated with a particular condition include, for example, the developer, supplier, or version of a particular software application or software image, an operating context in which the information handling system is used by an end user, the manufacturer or supplier of a battery in the information handling system, or the amount by which the power delivery performance of a battery in the information handling system has degraded.

As will be described in further detail, the inventors of the present disclosure have developed methods and systems disclosed herein for battery management unit (BMU) based runtime monitoring of power consumption associated with particular system components, applications, and events. In some embodiments, a battery management unit may be used in combination with system application flags to initiate power data logging events tied to system use. Power profiling routines executing at the battery management unit or on an embedded controller or other system component of the information handling system may allow the power consumption of certain components in the system and/or the whole system to be isolated and/or amplified. The system may be provisioned to perform multiple independent logging exercises concurrently, each having their own starting and ending points. Power data may be sampled by the battery management unit at a default (e.g., fixed) or configurable sample rate and logged by the battery management unit, embedded controller, or other system component at a default (e.g., fixed) or configurable logging interval. In some embodiments, power data logging may be performed in the factory by a manufacturer or supplier of the information handling system prior to delivery of the system to an end user. In other embodiments, power data logging may be performed in the field. In some embodiments, power data logging may be implemented using a dialog data validation (DDV) technique through which power data, power profile logs, and/or power profile reports may be captured or generated in the field and communicated to the manufacturer or supplier of the systems through a data pipe to a cloud computing server or service. The manufacturer or vendor may aggregate power data, power profile logs, and/or power profile reports from many information handling systems and may apply data analytics to determine suitable configurations for particular information handling systems dependent on their expected operating contexts, workloads, or other conditions. In some embodiments, historical records of logged power data and/or computed power consumption may be stored locally or on a remote system for use in determining changes in power consumption over time, or changes in power consumption due to a change in (or to) a hardware or software component, an application software image, a driver, an operating system, a power-usage or power-distribution policy, or other changes. In some embodiments, power profile data may be aggregated across multiple systems in order to perform comparisons between systems. For example, power profile reports may be captured or generated by a large number of systems to identify differences in power consumption for systems with different constituent components, for systems and/or components from different vendors, or for systems and/or components from the same vendor that were manufactured at different times. The power profile reports may be provided to an aggregator to facilitate this type of analysis. In some embodiments, the power logging techniques described herein may be initiated when information handling systems execute a specific software routine. The software routine may be configured to emphasize power consumption from a specific hardware component, while keeping the power consumption of other system components at a minimum, and the power profile reports generated by the systems may be sent to an aggregator for analysis. In one example, the software routine may be a display intensive performance benchmark. In some embodiments, the same software routine may be executed on many thousands or millions of systems in the field, or at a factory during manufacturing, and the power profile reports generated by those systems may be aggregated, or otherwise analyzed, to determine the power performance by SKU (e.g., to compare the performance of displays from different vendors) or by date (e.g., to compare the performance of displays from the same vendor on different manufacturing dates). The results of these types of analyses may be used to drive improvements in the power performance of the systems and/or specific components thereof, the total available market for particular systems and/or components, or for other purposes.

In some embodiments, an embedded controller or other system component may initiate power data sampling by a battery management unit. The battery management unit may monitor and sample current and/or charge associated with a battery and provide power data reflecting the sampled values to the embedded controller. The embedded controller or other system component may associate the power data with particular system components, applications, and events in a power profile log and may generate power profile reports indicating, or usable to determine, power consumption associated with the particular system components, applications, and events. In some embodiments, comparisons of the power consumption of particular system configurations and their performance can be made to determine suitable configurations for particular operating contexts and/or workloads.

Particular embodiments are best understood by reference to FIGS. 1, 2, 3, and 4.

Turning now to the drawings, FIG. 1 illustrates a block diagram depicting selected elements of an embodiment of information handling system 100. It is noted that FIG. 1 is not drawn to scale but is a schematic illustration. In various embodiments, information handling system 100 may represent different types of portable devices. A portable device may generally be any device that a user may carry for handheld use and that includes a processor. Typically, portable devices are powered using a rechargeable battery. Examples of a portable information handling system 100 may include laptop computers, notebook computers, netbook computers, tablet computers, and 2-in-1 tablet laptop combination computers, among others. In some instances, a portable information handling system 100 may represent certain personal mobile devices, and may further include examples such as media players, personal data assistants, digital cameras, cellular phones, cordless phones, smart phones, and other cellular network devices. In other embodiments, information handling system 100 may represent a type of computing device that is not generally considered portable, such as a desktop computer or a rack-mounted computing device.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Internal battery 171 may be a rechargeable battery. As illustrated in FIG. 1, in some embodiments, information handling system 100 may be removably coupled to an external DC power input 173 that may supply electrical power for operation of information handling system 100, including for charging internal battery 171, received from a DC power source through a direct current (DC) power source adapter 172.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for information handling system 100. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, some of which may be physically integrated within information handling system 100. As shown in FIG. 1, I/O subsystem 140 may comprise a touch panel 142 and a display adapter/driver 144, among other elements. Touch panel 142 may include circuitry for enabling touch functionality in conjunction with a display device, shown as display device 145, that is driven by display adapter/driver 144. Display adapter/driver 144 may include processing capability to receive display data and generate corresponding control signals to drive display device 145. In other embodiments, I/O subsystem 140 may include more, fewer, or different input/output devices or components. For example, in some embodiments, I/O subsystem 140 may include a keyboard, an accelerometer, a touch pad, a gyroscope, and/or a camera (such as a video camera, infrared camera, or other imaging devices or combinations thereof), among other examples. In some implementations, I/O subsystem 140 may support so-called 'plug and play' connectivity to external devices, in which the external devices may be added or removed while information handling system 100 is operating.

Display device 145 may be implemented in a fixed resolution corresponding to a number of pixels included within a display panel and may be implemented using various types of display technology, including, but not limited to, light-emitting diodes (LED), liquid crystal displays (LCD), plasma displays, etc. In some embodiments, display device 145 may include an actively illuminated element, such as a backlight. In various embodiments of information handling system 100, such as portable devices or so-called all-in-one devices, display device 145 may be mechanically integrated with other components. Furthermore, touch panel 142 may be integrated into display device 145 such that a touch user interface is provided to a user. The touch user interface typically coincides with a pixel space of display device 145 such that touch inputs correspond to certain display pixels, which may present user interface elements, such as buttons, menus, input fields, etc., to the user.

In particular embodiments, embedded controller 180 may support one or more power busses 176 that carry and distribute electrical power to and from information handling system 100. In some embodiments, power bus 176 may represent a data bus that also carries and distributes electrical power to and from information handling system 100. For example, a DC power input 173 received from an external DC power source adapter 172 may be routed over power bus 176 via a DC power connection 175 to BMU 170 for purposes of charging internal battery 171 or otherwise powering information handling system 100. In various embodiments, power bus 176 may represent a variable power bus that supports different levels of direct current (DC) power that may be provided to certain peripherals connected to I/O subsystem 140, including touch panel 142, display adapter/driver 144, and/or display device 145. In certain embodiments, a variable power bus 176 may be implemented according to an industry standard, such as a USB Universal Serial Bus (USB), which is developed and supported by the USB Implementers Forum, Inc. (USB IF, www.usb.org). In certain embodiments, a power bus 176 may receive a DC power input 173 through a connector other than a USB type connector. For example, a DC power source adapter 172 or another power source, such as a DC power adapter (not shown in FIG. 1), may include a barrel-type connector, a Lightning™ connector developed by Apple, Inc., or a Thunderbolt™ connector developed by Apple, Inc., among other connector types.

Also shown in FIG. 1 embedded controller (EC) 180 may include EC processor 182 as a second processor included within information handling system 100 for certain management tasks, including supporting communication and providing various functionality with respect to BMU 170. Thus, EC processor 182 may have access to EC memory 184, which may store EC firmware 186, representing instructions executable by EC processor 182. As shown, EC firmware 186 includes power management 185, which may represent executable code for controlling various operating parameters of internal battery 170. In some embodiments, power management 185 may include instructions for performing battery management unit based runtime monitoring of power consumption in information handling system 100, as disclosed herein.

In some embodiments, EC firmware 186 may include pre-boot instructions executable by EC processor 182. For example, EC firmware 186 may be operable to prepare information handling system 100 to boot by activating various hardware components in preparation of launching an operating system for execution. Accordingly, in some embodiments, EC firmware 186 may include a basic input/output system (BIOS). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable or are powered down. Furthermore, EC firmware 186 may be in control of EC communication interface(s) 188, which may represent one or more input/output interfaces or signals that embedded controller 180 can use to communicate with other elements of information handling system 100, such as processor subsystem 120 or I/O subsystem 140, among others.

In the illustrated embodiment, embedded controller 180 may be responsible for managing electrical power connections between internal or external power sources and other portions of information handling system 100. In other embodiments, power control may be implemented by a separate power controller external to embedded controller 180. For example, a power bus 176 may supply electrical power to information handling system 100, in which case embedded controller 180, or a separate power controller, may determine whether the electrical power is used to charge internal battery 171 or to directly power information handling system 100 or particular components thereof. In another example, embedded controller 180, or a separate power controller, may be configured to determine whether to supply electrical power supplied over power bus 176 (e.g., from DC power source adapter 172) or electrical power supplied by internal battery 171 to particular components of information handling system 100, such as display adapter/driver 144 and/or display device 145. In yet another example, embedded controller 180, or a separate power controller, may manage so-called 'soft start up' of information handling system 100, such as when information handling system 100 awakes from a low power state, such as sleep mode, by determining a source of power during the low power state and managing operation of information handling system 100 during the low power state.

In the illustrated embodiment, DC power and control 175 may represent suitable connections between embedded controller 180 and BMU 170, for example. This may include connections for providing data obtained from internal battery 171 (e.g., temperature, battery state, battery topology, battery state-of-charge (SOC), battery state of health (e.g., age), battery size, current charge, the amount of current flowing out of internal battery 171, the amount of charge delivered by internal battery 171, etc.), which may serve as inputs for performing battery management unit based runtime monitoring of power consumption in information handling system 100, as disclosed herein. In some embodiments, performing battery management unit based runtime monitoring of power consumption in information handling system 100 may also be dependent on an operating context of the information handling system and/or on the active applications that are currently executing on the information handling system or that are expected to be executing on the information handling system. It is noted that in some embodiments, at least certain portions of the methods for performing battery management unit based runtime monitoring of power consumption in information handling system 100 described herein may be implemented using EC firmware 186, such as specialized executable instructions for power management and control.

As illustrated in FIG. 1, information handling system 100 may include a battery management unit (BMU) 170 that controls operation of internal battery 171. In particular implementations, BMU 170 may be embedded within a respective battery whose operation BMU 170 controls. For example, BMU 170 within information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

As used herein, "top-of-charge voltage" (or "TOC" voltage) refers to a voltage threshold used during a charge cycle of a battery to determine a 100% charge level. It is noted that the top-of-charge voltage set on a given battery may be lower than a "maximum charge voltage", which may specify a maximum voltage that a given battery having a given battery chemistry can safely endure during charging without damage. As used herein, the terms "state of charge", "SOC", or "charge level" refer to an actual charge level of a battery, from 0% to 100%, for example, based on the currently applied top-of-charge voltage. The SOC may be correlated to an actual voltage level of the battery, for example, depending on a particular battery chemistry.

In various embodiments, internal battery 171 may include at least certain portions of a main power circuit across positive and negative terminals, a current sensor, a voltage sensor, one or more battery cells, a fuse, and a power switch (not shown). The current sensor may represent a shunt resistor, or other current sensing element, over which a voltage that is directly proportional to the current flowing through the main power circuit is measured. The battery cells may store and output electrical energy based on a given electrochemical composition internal to the battery cells. In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. In some embodiments, internal battery 171 may include one or more cells based on any one of a variety of Lithium-ion electrochemistries, or one or more cells based a different electrochemistry than Lithium-ion. The voltage sensor may enable voltage measurement of individual battery cells, or measurement of an aggregate voltage for the battery including all battery cells operating together. One or more temperature sensors may be located in proximity to the battery cells to provide accurate indications of the temperature at different locations within battery 171. The fuse may be a safety element for limiting current flowing through the main power circuit. The power switch may be an electronically controlled switching element that closes or opens the main power circuit, and thereby allows the battery to operate for charging or discharging.

As shown in FIG. 1, a DC power source adapter 172 may be designed to couple to information handling system 100 using a power bus 176. For example, a power bus 176 may include power connections for electrically coupling DC power source adapter 172 to information handling system 100 as an external load on DC power source adapter 172. In certain embodiments, a power bus 176 may be a variable power bus that also includes a communication link to enable a DC power source adapter 172 to communicate with information handling system 100. In other embodiments, there may be a communication link between DC power source adapter 172 and information handling system 100 that is separate from any power bus 176 instead of, or in addition to, a communication link that is part of a variable power bus 176. In some embodiments, a communication link between DC power source adapter 172 and information handling system 100 may operate in accordance with a System Management Bus (SMBus) protocol for sending and receiving data. In particular embodiments, a variable power bus 176 may be compatible with USB Type-C and may be implemented according to USB Type-C and USB Power Delivery specifications promulgated by USB IF.

In FIG. 1, BMU 170 may include a charging unit (CU) 174 that may control charging cycles for internal battery 171 and may apply a TOC voltage as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters or other operating parameters received from one or more battery cells in internal battery 171 including, but not limited to, the amount of current flowing into internal battery 171 and/or the amount of current flowing out of internal battery 171. Additional parameters monitored by BMU 170 may include a charging current, a voltage, a battery impedance, and a temperature associated with internal battery 171, and any other measurement of the overall condition of internal battery 171, in various embodiments. In some embodiments, monitoring the SOC may include continuous or periodic monitoring of output current, voltage, or other operating parameters (or elements thereof) of internal battery 171. In some embodiments, Coulomb counting, in which the charge delivered or stored by a battery is tracked, is used for monitoring the amount of charge delivered by internal battery 171. In some embodiments, a battery temperature may be monitored through the use of periodic voltage measurements, a thermometer, or another type of sensor or method to detect or correct for variations in temperature. In some embodiments, at least some of the parameters monitored by BMU 170 may be used internally by BMU 170 for internal battery management operations. In some embodiments, at least some of the parameters monitored by BMU 170 may be provided to embedded controller 180 (or power management 185 thereof) or another system component to implement the methods disclosed herein for performing battery management unit based runtime monitoring of power consumption in information handling system 100, as well as for internal battery management. In some embodiments, power management 185 may be, or include, a power management microcontroller for portable electronics that is designed to perform battery management unit based runtime monitoring of power consumption in information handling system 100, as described herein. In some embodiments, power management 185 may be, or include, a battery management microcontroller for portable electronics that is designed to accept multiple inputs including, for example, temperature inputs and/or digital data inputs representing various power data elements. In some embodiments, the power management methods described herein may take advantage of such hardware, if available in the information handling system. In other embodiments, BMU 170 may be configured to implement internal battery management.

In some embodiments, BMU 170 may calculate additional values, based on the monitored battery parameters or other information obtained from a battery (such as internal battery 171) in order to make decisions related to the charging and operation of the battery. For example, BMU 170 may calculate any or all of a charge current limit (CCL), a discharge current limit (DCL), a total amount of energy delivered, an amount of energy delivered since the last charge, an amount of charge delivered or stored, a number of charging cycles, a total operating time, an operating time since the last charge. In some embodiments, BMU 170, or another component of information handling system 100, may analyze and compare monitored parameter values to historic values or predicted models relative to an SOC of the battery, and may calculate the remaining battery life. Remaining battery life may refer to a duration or a fraction of a time period remaining that a battery may safely provide electrical power, an amount or a fraction of a voltage drop remaining over which a battery may safely provide electrical power, or an amount or a fraction of a discharge capacity remaining that a battery may safely provide electrical power. For example, a remaining battery capacity may be measured in mWh by BMU 170. Based on the obtained and calculated values, BMU 170 may detect various alert conditions associated with a battery, conditions such as battery charge full, battery charge empty, battery charging, battery discharging, battery over temperature, battery over current, other battery system status conditions, or various combinations thereof.

In certain embodiments, BMU 170 may include a processor and memory (not shown). The memory may store instructions executable by the processor to perform one or more methods for performing battery management unit based runtime monitoring of power consumption in information handling system 100 and for controlling the operation and charging of the battery. The memory may also store data, obtained and calculated values, thresholds, and/or any other parameters related to the methods described herein.

Different embodiments and instances of information handling system 100 may include different combinations of hardware and software components, each of which may correspond to a different stock keeping unit, or SKU, and some of which may require configuration-specific power distribution, voltage boosting, and/or power delivery circuitry. In at least some embodiments, the methods described herein for performing battery management unit based runtime monitoring of power consumption in information handling system 100 may be dependent on, and/or may be used to compare the power consumption of, information handling systems that include particular hardware and software components or particular combinations of hardware and software components.

Figure 2:
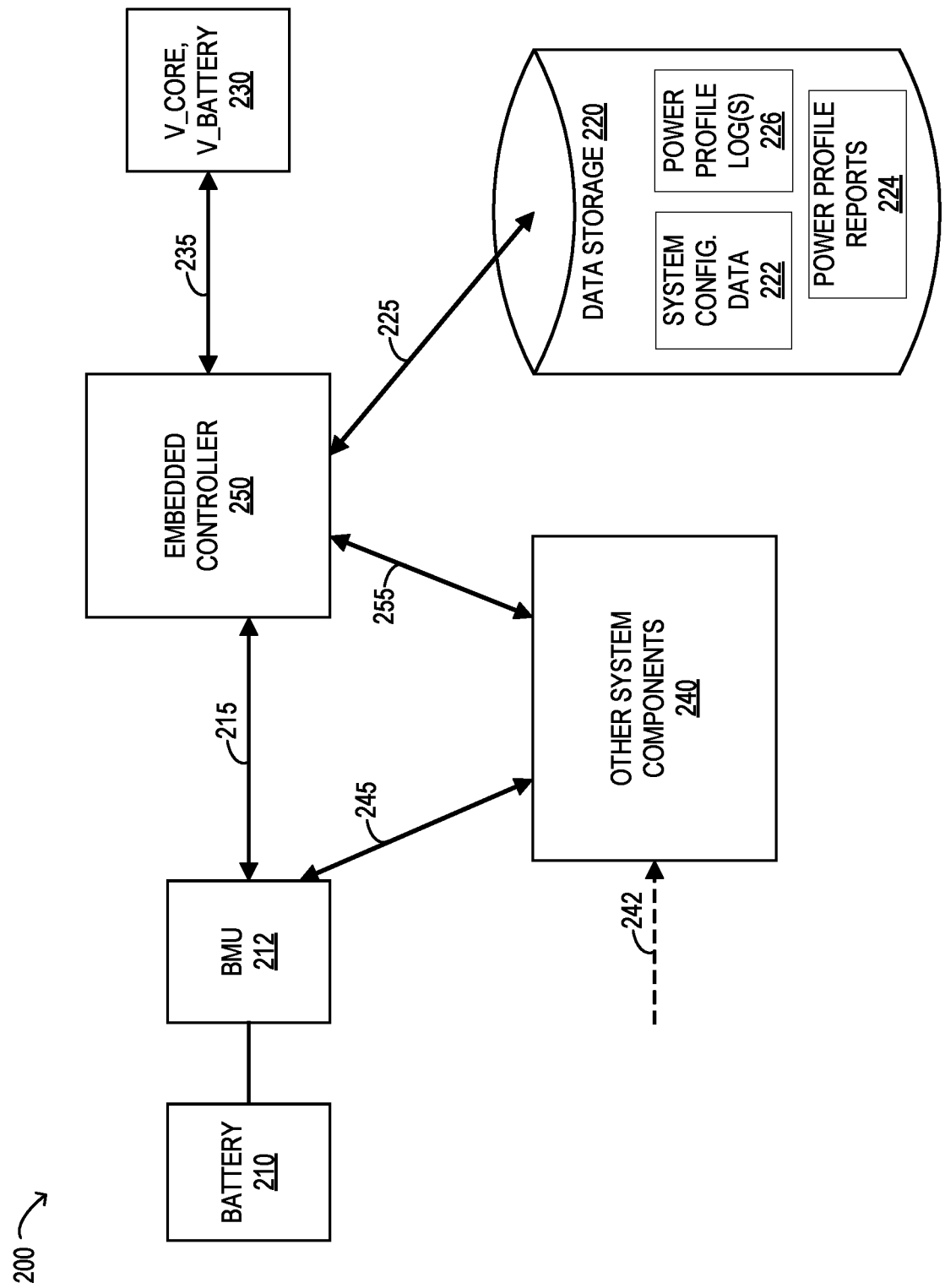
FIG. 2 is a block diagram illustrating interactions between selected elements of an embodiment of an information handling system that provides battery management unit (BMU) based runtime monitoring of power consumption associated with particular system components, applications, and events.

FIG. 2 is a block diagram illustrating interactions between selected elements of an embodiment of an information handling system 200 that provides battery management unit (BMU) based runtime monitoring of power consumption associated with particular system conditions, components, applications, and events. In the illustrated embodiment, information handling system 200 includes battery 210, BMU 212, embedded controller (EC) 250, data storage 220, and other system components 240. In at least some embodiments, battery 210 may be similar to internal battery 171 illustrated in FIG. 1, BMU 212 may be similar to BMU 170 illustrated in FIG. 1, and embedded controller 250 may be similar to embedded controller 180 illustrated in FIG. 1.

In various embodiments, other system components 240 may include one or more components similar to components illustrated in FIG. 1 including, but not limited to, a processor subsystem, a memory, an I/O subsystem, a local storage resource, and/or a network interface. In some embodiments, a network interface or another system component 240 may be configured to receive control signals and/or instructions from a remote computing system (such as from a remote test or validation system or process thereof). These control signals and/or instructions are shown in FIG. 2 as remote input(s) 242.

In at least some embodiments, BMU 212 may be configured to monitor various charging-related parameters and/or other operating parameters received from one or more battery cells in battery 210 including, but not limited to, the amount of current flowing into battery 210, the amount of current flowing out of battery 210, and/or the charge delivered by battery 210 to power the operation of information handling system 200. In some embodiments, BMU 212 may include a microcontroller (or a processor and memory) and may be configured to implement one or more methods for performing power monitoring in information handling system 200 and for controlling the operation and charging of battery 210. In operation, BMU 212 may sample power data including the current flowing into or out of battery 210 or the charge delivered by battery 210 at a particular sample rate. In one example embodiment, BMU 212 may have the ability to monitor, report, and/or log power data at a rate of up to four samples per second. BMU 212 may communicate the sampled power data (e.g., as digital data) to embedded controller 250 over a connection shown in FIG. 2 as 215 and/or to one or more other system components 240 over a connection shown as 245. In various embodiments, BMU 212 may provide the sampled power data to embedded controller 250 or other components 240 in real time as the samples are taken or may first store and/or aggregate at least a portion of the sampled data prior to communicating the sampled data (in raw or aggregated form) to embedded controller 250 or other system components 240.

In at least some embodiments, embedded controller 250 may include an EC processor as an auxiliary processor included within information handling system 200 for certain management tasks, including supporting communication and providing various functionality with respect to BMU 212. For example, the EC processor may have access to an EC memory, which may store firmware representing instructions executable by the EC processor for controlling various operating parameters of battery 210. In some embodiments, the EC firmware may include instructions for performing battery management unit based runtime monitoring of power consumption in information handling system 200. Embedded controller 250 may receive inputs (e.g., sampled power data) from and/or provide data or control signals to BMU 212 over connection 215. Embedded controller may receive inputs (e.g., data or control signals) from and/or provide data or control signals to other system components 240 over connection 255. Embedded controller 250 may obtain data from and/or write data to data storage 220 over connection 225.

In operation, embedded controller 250 may receive one or more inputs triggering power monitoring in light of a particular condition or may detect (locally) a trigger for beginning power monitoring in light of a particular condition. In response, embedded controller 250 may capture a current system state, including information about hardware and/or software components of information handling system 200. Embedded controller 250 may also create or access a power profile log 226 in data storage 220 into which power data associated with the particular condition is to be written and may write data representing the current system state to power profile log 226. In addition, embedded controller 250 may begin receiving or obtaining from BMU 212, sampled power data associated with the particular condition and may store at least a portion of the power data to power profile log 226. Other inputs to embedded controller 250 may include information indicating an operating context or mode of the information handling system and/or the active applications that are currently executing on the information handling system or that are expected to be executing on the information handling system, information indicating the presence of a particular component (e.g., a particular make, model, supplier, or version of a particular hardware or software component) in the information handling system, or the presence of a particular configuration of components in the information handling system (e.g., a configuration defined by particular stock keeping unit, or SKU), some or all of which may be reflected in, and obtained by embedded controller 250 from, system configuration information 222 in data storage 220.

In operation, embedded controller 250 may receive one or more input indicating that power monitoring in light of the particular condition should cease or may detect (locally) a trigger for ending power monitoring in light of the particular condition. In response, embedded controller 250 may capture a second system state and write data representing the second system state to power profile log 226. In some embodiments, embedded controller 250 may capture and log a respective system state corresponding to each power data sample obtained from BMU 212. As a result of the power monitoring, power profile log 226 may include power data that is linked to the particular condition, such as a system application activity, a hardware focused routine, or another condition that potentially affects power consumption in information handling system 200 including, but not limited to, those described herein. Embedded controller 250 may, based on system configuration data 222, power profile log 226, and/or other inputs, generate a power profile report 224 indicating, or usable to determine, power consumption in information handling system 200 associated with the particular condition.

Data storage 220 may be configured to store information used in any of the methods described herein and other methods. For example, data storage 220 may store respective system configuration information 222 for one or more system configurations (e.g., SKUs) including identifiers or other parameters associated with the hardware and software components included in each of multiple possible SKU configurations. This may include make, model, supplier, and/or version information for each of the hardware and software components of information handling system 200. In some embodiments, system configuration information 222 may include physical and/or operating parameters associated with the components included in each of the possible SKU configurations. In some embodiments, parameters of certain hardware components of information handling system 200 may be stored in a look-up table in association with respective Extended Display Identification Data (EDID) values for those components. In some embodiments, system configuration information 222 may include BIOS parameters indicating, among other things, which of the SKU configurations is implemented in the system. In some embodiments, the information stored in data storage 220 may include one or more power profile logs 226 (e.g., respective power profile logs including power data sampled and obtained over different periods of time) and one or more power profile reports 224, each of which may indicate, or be usable to determine, power consumption in information handling system 200 associated with a respective condition. In various embodiments, all or a portion of data storage 220 may be implemented within memory 130 and/or local storage resource 150 illustrated in FIG. 1.

In some embodiments, embedded controller 250 may receive data from and/or provide one or more control signals to one or more available external power sources and/or the internal battery in the system (such as battery 210). For example, embedded controller 250 may be configured to enable various power sources and/or to control from which one or more of the sources power is supplied to the rest of information handling system 200. In some embodiments, additional inputs to embedded controller 250 may include, for example, data indicating the state of the input power supplied by one or more available external power sources and/or the state of an internal battery in the system, shown as V_core, V_battery 230.

Figure 3:
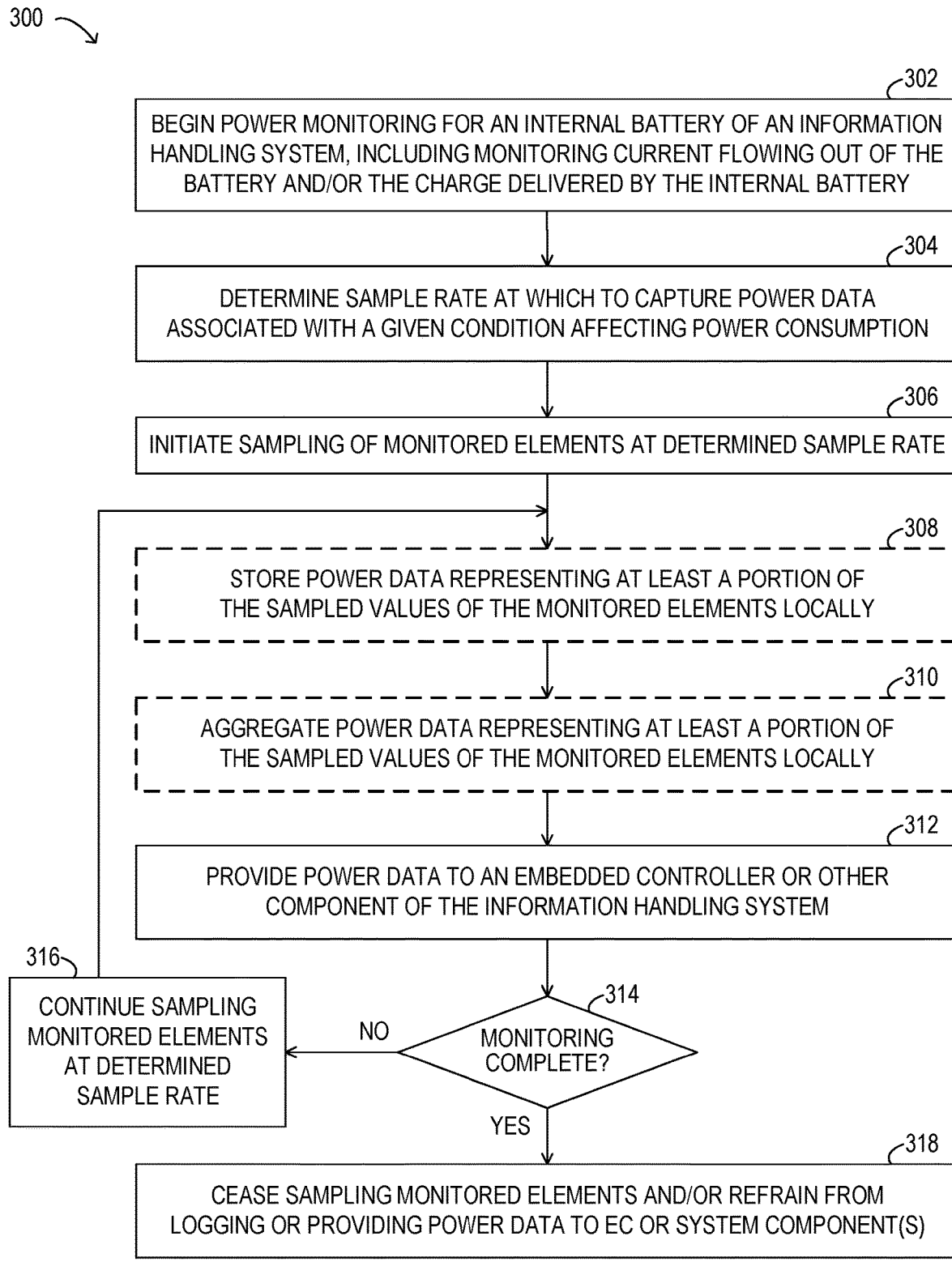
FIG. 3 is flowchart depicting selected elements of an embodiment of a method for power monitoring by a battery management unit.

FIG. 3 is a flowchart depicting selected elements of an embodiment of a method 300 for power monitoring by a battery management unit, as described herein. In various embodiments, method 300 may be performed using information handling system 100 (see FIG. 1) or information handling system 200 (see FIG. 2) and, in particular, by internal BMU 170, which controls certain operations of internal battery 171, or BMU 212, which controls certain operations of battery 210. Method 300 may be performed once or repeatedly to perform power monitoring in an information handling system. For example, method 300 may be performed periodically, on demand (e.g., in response to receipt of a user input), or in response to certain conditions in an information handling system, in different embodiments. It is noted that certain operations described in method 300 may be optional or may be rearranged in different embodiments.

Method 300 may include, at 302, beginning power monitoring for an internal battery of an information handling system, including monitoring the current flowing out of the battery and/or the charge delivered by the internal battery. In some embodiments, the BMU may be directed to begin power monitoring by an embedded controller (such as embedded controller 180 illustrated in FIG. 1 or embedded controller 250 illustrated in FIG. 2) or another component of the information handling system. In other embodiments, power monitoring may be performed continuously by the BMU while the information handling system is operating in a particular mode (e.g., during normal operation or during a testing mode). In still other embodiments, the BMU may begin performing power monitoring periodically (e.g., at default or configurable intervals) and may continue power monitoring until a timer expires.

At 304, method 300 may include determining a sample rate at which to capture power data associated with a given condition that affects power consumption. In one example embodiment, the determined sample rate may be a default sample rate. In other embodiments, the determined sample rate may be configurable and may be communicated to the BMU by the embedded controller or another system component. In some embodiments, the determined sample rate may be based on application-specific or context-specific requirements for a particular power monitoring exercise.

At 306, the method may include initiating the sampling of monitored elements at the determined sample rate. For example, the BMU may be operable to sample the current flowing out of the battery and/or the charge delivered by the battery at the determined sample rate.

In some embodiments, method 300 may (optionally) include storing power data representing at least a portion of the sampled values of the monitored elements locally (e.g., at the BMU), as in 308. In some embodiments, method 300 may (optionally) include aggregating power data representing at least a portion of the sampled values of the monitored elements locally (e.g., at the BMU), as in 310. In some embodiments, the BMU may include a relatively small amount of memory for data storage as compared to the amount of data storage available in the embedded controller. In some embodiments, the BMU may log power data locally at each sampling interval. In other embodiments, the BMU may monitor certain elements at the sample rate and log the sampled power data only at specific values. For example, the power data may be logged only when the battery voltage is above or below a particular voltage threshold, when the battery voltage is within a particular voltage range, when the battery temperature is above or below a particular temperature threshold, when the battery temperature is within a particular temperature range, or when other battery status conditions are met.

At 312, the method may include providing power data to an embedded controller or other component of the information handling system for storage and/or analysis. In various embodiments, the power data may be communicated over a data line, a data bus, a combination power/data line or a combination power/data bus to the embedded controller or other system component for analysis. In various embodiments, the power data may be communicated to the embedded controller or other system component in real time (e.g., as is it sampled by the BMU) or may be aggregated by the BMU prior to being provided to the embedded controller or other system component.

If, at 314, the power monitoring operation is complete, method 300 may proceed to 318. In some embodiments, if the power monitoring was initiated in response to a starting trigger or given condition in the information handling system, the power monitoring may be complete when an ending trigger is detected or when the given condition is no longer met. In other embodiments, the power monitoring may be complete when a timer expires or when the BMU is directed (e.g., by the embedded controller or other system component) to cease power monitoring. As illustrated in FIG. 3, the method may, under these and other circumstances, include ceasing the sampling of the monitored elements and/or refraining from logging or providing power data to the embedded controller or other system component(s), as in 318.

However, if, at 314, it is determined that the power monitoring operation is not complete, method 300 may continue at 316. At 316, the method may include continuing to sample the monitored elements at the determined sample rate and returning to 308 one or more times until the power monitoring operation is complete.

In some embodiments, the operations of method 300 illustrated in FIG. 3 may be repeated if and when the BMU is directed to begin power monitoring by an embedded controller (such as embedded controller 180 illustrated in FIG. 1 or embedded controller 250 illustrated in FIG. 2) or another component of the information handling system following a cessation of power monitoring. For example, in some embodiments, method 300 may be repeated following a change in the information handling system, such as a hardware or software component change, a configuration change, or a change in the operating mode of the information handling, and the power data logged when the method is repeated may be non-overlapping (in time) with power data logged during a previous performance of the method. In some embodiments, some or all of the operations of method 300 may be repeated in light of a second condition in the information handling system other than a component or mode change. In some embodiments, power data logging associated with the second condition may be performed concurrently with power data logging associated with a previously specified condition such that the logging exercises overlap in time and the power data sampled by the BMU may be communicated to the embedded controller or other component of the information handling system for use in determining power consumption associated with each of the conditions individually or with the combination of specified conditions, with the receiver(s) of power data being responsible for filtering the received power data to extract the power data of interest for particular analyses. In some embodiments, if a second or subsequent power data logging exercise is initiated while another one or more power data logging exercises are in progress, the initiation of the second or subsequent power data logging exercise may cause a change in the sample rate, e.g., if more frequent sampling is required or requested for the second or subsequent exercise. In other embodiments, in response to the initiation of a second or subsequent power data logging exercise while another one or more power data logging exercises are in progress, the BMU may continue sampling at the previously determined sampling rate. In some embodiments, the operations of method 300 shown in FIG. 3 may be enabled and/or disabled by the embedded controller or another system component irrespective of any trigger for monitoring power consumption associated with a particular condition (e.g., for other reasons). In some embodiments, once enabled, the operations of method 300 shown in FIG. 3 may be performed continuously or periodically (e.g., on a fixed or configurable interval) by the BMU until and unless power data sampling is explicitly disabled.

Figure 4:
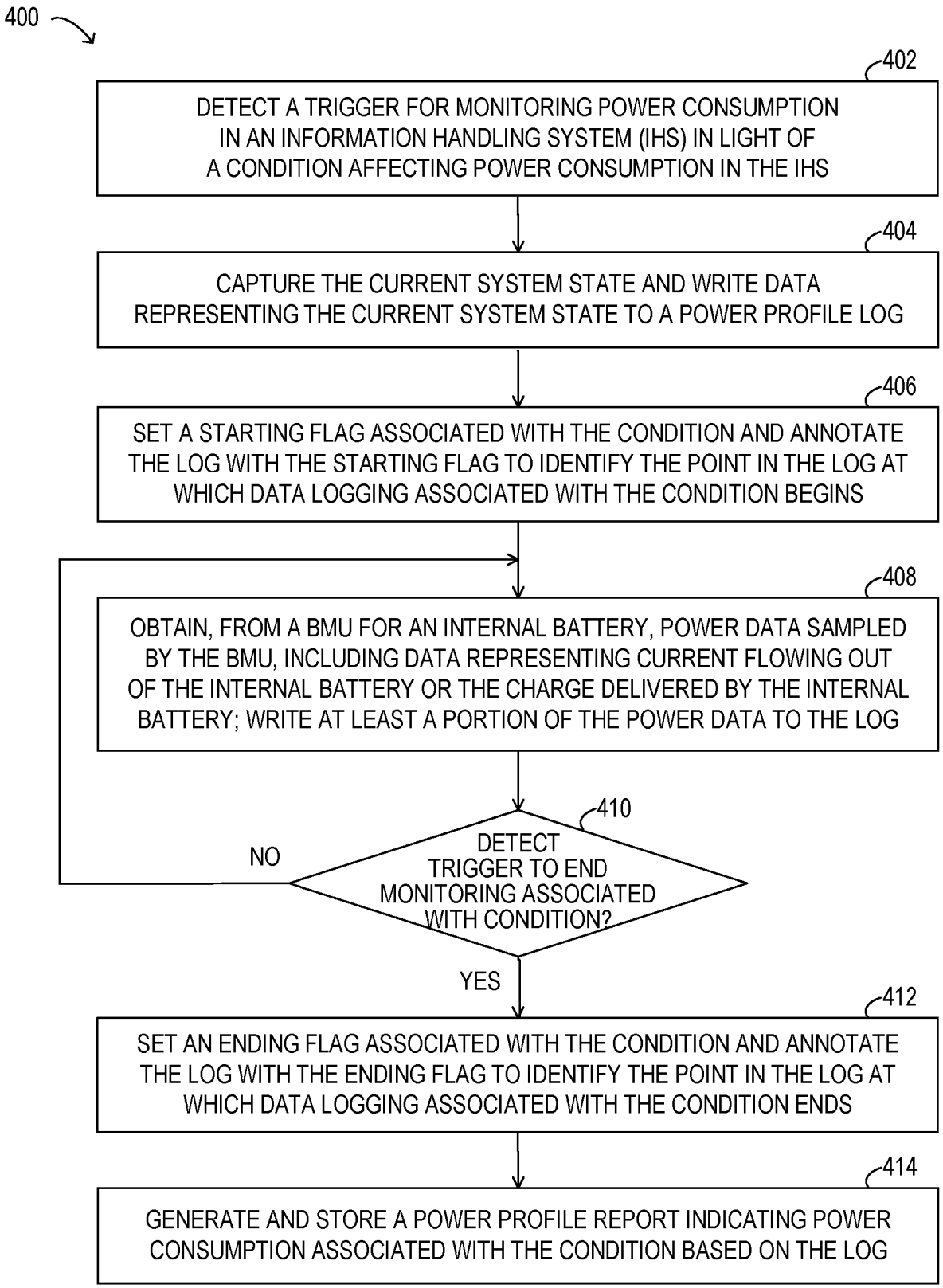
FIG. 4 is flowchart depicting selected elements of an embodiment of a method for BMU based runtime monitoring of power consumption associated with particular system components, applications, and events.

FIG. 4 is flowchart depicting selected elements of an embodiment of a method 400 for BMU based runtime monitoring of power consumption associated with particular system components, applications, and events. In various embodiments, method 400 may be performed using information handling system 100 (see FIG. 1) or information handling system 200 (see FIG. 2) and, in particular, by power management 185 within embedded controller 180 or embedded controller 250, or by another system component of information handling system 100 or information handling system 200. Method 400 may be performed once or multiple times (e.g., serially or in parallel) to perform BMU based runtime monitoring of power consumption associated with one or more system components, applications, and/or events. For example, method 400 may be performed in response to particular triggers to obtain and associate power data received from a battery management unit with particular conditions in the information handling system. It is noted that certain operations described in method 400 may be optional or may be rearranged in different embodiments.

Method 400 may include, at 402, detecting a trigger for monitoring power consumption in an information handling system in light of a particular condition that affects power consumption in the information handling system. In some embodiments, the condition may include the recent execution of a particular program instruction (e.g., the execution of a program instruction to set a flag or otherwise signal the beginning of the monitoring or reaching a particular point in a software program) in the information handling system or in a system that is remote from the information handling system and is communicatively coupled to the information handling system. In other embodiments, the condition may include the presence of a particular component (e.g., a particular make, model, supplier, or version of a particular hardware or software component) in the information handling system or the presence of a particular configuration of components in the information handling system (e.g., a configuration defined by particular stock keeping unit, or SKU). In still other embodiments, the condition may include the execution of a given version of a software image in the information handling system, or the operation of the information handling system in a particular operating mode.

The trigger may initiate an operation to determine the power consumption of the information handling system in light of the particular condition in order to, for example, determine whether and/or how the power consumption is affected by the particular condition or what the power consumption of the information handling system is when the particular condition is met. In some embodiments, the trigger may be a flag representing a power event in the information handling system. The flag may be set automatically by hardware or by the operating system in response to the power event. For example, in some embodiments, power consumption monitoring may be triggered when the information handling system enters or exits a particular operating mode, such as a sleep mode, a hibernation mode, or one of multiple low-power or full-power operating modes. In some embodiments, the trigger may involve reaching a particular known point in the execution of an operating system routine or a user application. For example, a flag may be set in software when a specified condition is met or when the execution of the software reaches a specified point. In some embodiments, the power consumption monitoring may be triggered remotely, such as by a remote test or validation routine executing on a system communicatively coupled to the information handling system over a local or remote network.

At 404, method 400 may include capturing the current system state and writing data representing the current system state to a power profile log. For example, the data representing the captured system state may include any or all of the following: respective identifiers of hardware and/or software components in the information handling system, respective identifiers of vendors or suppliers of various hardware or software components in the information handling system, respective identifiers of models or versions of various hardware or software components in the information handling system, data indicating a current status of a battery in the information handling system, and/or data indicating a current operating mode of the information handling system, in various embodiments.

In the illustrated embodiments, method 400 may include, at 406, setting a starting flag associated with the particular condition and annotating the power profile log with the starting flag to identify the point in the power profile log at which power data logging associated with the particular condition begins. In this example embodiment, the starting flag may be used to trigger the collection of power data associated with the particular condition and/or to index into the power profile log at an entry point associated with the particular condition. In other embodiments, the power profile log may be annotated with another type of identifier or tag of an entry point associated with the particular condition. In some embodiments, the method may not rely on a starting flag to trigger the collection of power data associated with the particular condition or to annotate an entry point in the power profile log, in which case no such flag is set.

At 408, the method may include obtaining, from a battery management unit that controls certain operations of an internal battery, power data sampled by the battery management unit, including data representing an amount of current flowing out of the internal battery or an amount of charge delivered by the internal battery. The method may also include writing at least a portion of the power data to the power profile log. As described above, in some embodiments, the power data may first be stored and/or aggregated at the battery management unit prior to being provided to (or being obtained by) an embedded controller or another component of the information handling system. In other embodiments, some or all of the power data sampled by the BMU may be provided to an embedded controller or another component of the information handling system in real time as the monitored elements are sampled by the BMU. In some embodiments, obtaining the power data may include reading or polling one or more data storage locations within the BMU.

If, at 410, a trigger to end monitoring associated with the particular condition is detected, the method may proceed to 412. Otherwise, the method may return to 408 where power consumption monitoring of the information handling system continues based on data obtained from the BMU. In some embodiments, a trigger to end power consumption monitoring may involve the clearing of a flag that was previously set to initiate power consumption monitoring associated with the particular condition. In other embodiments, the trigger to end monitoring associated with the particular condition may involve the setting of a second (ending) flag, the expiration of a timer, the first condition no longer being met, the execution of a given program instruction in the information handling system, the execution of a given program instruction in a system that is remote from the information handling system and is communicatively coupled to the information handling system, the removal of a given component from the information handling system, a change in a configuration of components in the information handling system, or a change in an operating mode of the information handling system.

In the illustrated embodiment, method 400 may include, at 412, setting an ending flag associated with the condition and annotating the log with the ending flag to identify the point in the log at which data logging associated with the condition ends. In this example embodiment, the ending flag may be used to trigger cessation of the collection of power data associated with the particular condition and/or to index into the power profile log at an exit point associated with the particular condition. In some embodiments, a single flag associated with a particular condition may be set when power data logging associated with the particular condition is initiated and may be cleared when power data logging associated with the particular condition ceases, enabling the single flag to serve as both a starting flag and an ending flag. In some embodiments, the power profile log may be annotated with another type of identifier or tag of an exit point associated with the particular condition. In some embodiments, the method may not rely on an ending flag to trigger the cessation of the collection of power data associated with the particular condition or to annotate an exit point in the power profile log, in which case no such flag is set. In some embodiments, the method may (optionally) include capturing the system state a second time when power data logging associated with the particular condition ceases. In such embodiments, data representing the second system state may be written to the power profile log and associated with the flag or other identifier of the exit point associated with the particular condition.

At 414, the method may include generating and storing a power profile report indicating power consumption associated with the particular condition based on the power profile log and the annotations thereof. In some embodiments, generating the power profile report may include determining differences between the initially captured system state and the second system state, such as a trend or rate of change between power data values included in the initially captured system state and the second system state. In some embodiments, generating the power profile report may include computing an average of power data values logged between the entry and exit points associated with the particular condition, which may include a root mean square (RMS) value for voltage or current data associated with the particular condition and/or a variance in the power data values.

In some embodiments, the power profile report may compare the power consumption associated with the particular condition and power consumption associated with a previous condition to determine the effect of one or more differences between the previous condition and the particular condition. In some embodiments, the power profile report may include a recommended action to be taken to reduce power consumption in the information handling system based on such a comparison. For example, the differences between the previous condition and the particular condition may include a change in (or to) a hardware or software component. The change may include a change in the make, model, supplier, or version of a hardware or software component. If the power consumption was higher following the change, the power profile report may include a recommendation to reverse the change or to identify a different change (e.g., a change to a component from a different manufacturer or supplier) to reduce power consumption in the information handling system. In another example, the differences between the previous condition and the particular condition may include a change to a more power-hungry application, and the power profile report may include a recommendation to enable or disable particular hardware and/or software components, or to postpone lower priority activities, in the information handling system to better match the use of power resources in the information handling system to its workload.

In some embodiments, the operations of method 400 illustrated in FIG. 4 may be repeated if and when an embedded controller (such as embedded controller 180 illustrated in FIG. 1 or embedded controller 250 illustrated in FIG. 2) or another component of the information handling system detects a trigger for initiating or resuming BMU based runtime monitoring of power consumption associated with a respective condition. For example, in some embodiments, method 400 may be repeated following a change in the information handling system, such as a hardware or software component change, a configuration change, or a change in the operating mode of the information handling, and the power data logged when the method is repeated may be non-overlapping (in time) with power data logged during a previous performance of the method. In some embodiments, some or all of the operations of method 400 may be repeated in light of a second condition in the information handling system other than a component or mode change. In some embodiments, BMU based runtime monitoring of power consumption associated with the second condition may be performed concurrently with BMU based runtime monitoring of power consumption associated with a previously specified condition such that these exercises overlap in time and the power data sampled by the BMU and received by the embedded controller or other component of the information handling system may be used in determining power consumption associated with each of the conditions individually or with the combination of specified conditions, with the receiver(s) of the power data being responsible for filtering the received power data to extract the power data of interest for particular analyses. In some embodiments, if a second or subsequent exercise to perform BMU based runtime monitoring of power consumption is initiated while another one or more such exercises are in progress, the initiation of the second or subsequent exercise may cause the embedded controller or other component to request a change in the sample rate at which the BMU captures power data, e.g., if more frequent sampling is required or requested for the second or subsequent exercise. In other embodiments, when a second or subsequent exercise to perform BMU based runtime monitoring of power consumption is initiated while another one or more such exercises are in progress, the BMU may continue sampling at the previously determined sampling rate. In some embodiments, the operations of method 400 shown in FIG. 4 may be enabled and/or disabled by the embedded controller or another system component irrespective of any trigger for monitoring power consumption associated with a particular condition (e.g., for other reasons). For example, in some embodiments, a performance of method 400 may be initiated to generate a new power profile (e.g., in a startup condition) following a recovery from a system or component failure or physical damage to the information handling system (or a component thereof).

Proof of concept work has shown a direct linkage between BMU based runtime monitoring of power consumption, as described herein, and direct data logging in a lab environment. For fine granularity events, a sampling rate of four samples per second has been shown to be more than sufficient for long duration studies. In some embodiments, the sample rate may be tuned to provide the highest accuracy and lowest impact to the application and battery capability. In some embodiments, the techniques described herein for performing BMU based runtime monitoring of power consumption may be applied when an information handling system is operating on power supplied by an external battery or a DC power source adapter if the external battery or DC power source adapter includes a BMU (or other component) configured to sample power data and provide it to an embedded controller or other system component for analysis.

As described herein, an information handling system may implement sensor-less techniques for detecting a trigger for monitoring power consumption in light of a first condition, capturing a state of the information handling system, writing data representing the state of the information handling system to a power profile log, annotating the power profile log with an identifier of a point at which logging associated with the first condition begins, obtaining, from a battery management unit, power data representing an amount of current flowing from or charge delivered by a battery in the information handling system, writing at least some of the power data to the power profile log, detecting a trigger for ending monitoring associated with the first condition, annotating the power profile log with an identifier of a point at which logging associated with the first condition ends, and generating, dependent on the annotations of the identifiers in the power profile log, a power profile report indicating power consumption associated with the first condition. The first condition may be any of a variety of conditions for which power consumption information is desired including, but not limited to, those described herein. In one example, the power profile report may indicate power consumption associated with a hardware-focused benchmarking application, such as a benchmark for measuring the performance of a graphics card or another hardware component of an information system, or for an application that, at least temporarily, disables or throttles certain hardware or software components in order to maximize and/or measure the power consumption of one or more other components.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a battery;
   a battery management unit that controls operation of the battery; and
   an embedded controller, comprising:
      a processor; and
      non-transitory computer readable memory media storing instructions executable by the processor for:
         detecting a first trigger for monitoring power consumption in the information handling system in light of a first condition in the information handling system, the first condition including presence of a given component in the information handling system;
         capturing a first state of the information handling system;
         writing data representing the first state of the information handling system to a power profile log;
         annotating the power profile log with a first identifier of a point in the power profile log at which data logging associated with the first condition begins;
         obtaining, from the battery management unit, power data sampled by the battery management unit at a first rate based on the first condition, including data representing an amount of current flowing out of the battery or an amount of charge delivered by the battery;
         writing at least a portion of the power data to the power profile log;
         detecting a second trigger for ending the monitoring of power consumption in the information handling system in light of the first condition;
         annotating the power profile log with a second identifier of a point in the power profile log at which data logging associated with the first condition ends;
         generating, dependent on the annotations of the first and second identifiers in the power profile log, a first power profile report indicating power consumption associated with the first condition;
         detecting a third trigger for monitoring power consumption in the information handling system in light of a second condition in the information handling system, wherein the third trigger is detected prior to detection of the second trigger, the second condition including transitioning the information handling system between a full-power operating mode and a low-power operating mode;
         capturing a second state of the information handling system;
         writing data representing the second state of the information handling system to the power profile log;
         annotating the power profile log with a third identifier of a point in the power profile log at which data logging associated with the second condition begins;
         obtaining, from the battery management unit and while obtaining of the power data at the first rate is concurrently in progress, additional power data sampled by the battery management unit at a second rate based on the second condition, the second rate differing from the first rate, including data representing an amount of current flowing out of the battery or an amount of charge delivered by the battery;
         writing at least a portion of the additional power data to the power profile log;
         detecting a fourth trigger for ending the monitoring of power consumption in the information handling system in light of the second condition;
         annotating the power profile log with a fourth identifier of a point in the power profile log at which data logging associated with the second condition ends;
         generating, dependent on the annotations of the third and fourth identifiers in the power profile log, a second power profile report indicating power consumption associated with the second condition; and
         in response to the first power profile and the second power profile, providing control signals to the battery to control the charging of the battery,
         wherein obtaining the power data that is sampled at the first rate and in light of the first condition overlaps in time with obtaining at least a portion of the additional power data that is sampled at the second rate and in light of the second condition.

2. The information handling system of claim 1, wherein the power data obtained from the battery management unit is received from the battery management unit in real time as it is sampled by the battery management unit.

3. The information handling system of claim 1, wherein the power data obtained from the battery management unit comprises sampled power data that has been aggregated by the battery management unit.

4. The information handling system of claim 1, wherein the data representing the first state of the information handling system comprises one more of:
   a respective identifier of each of one or more hardware or software components in the information handling system;
   a respective identifier of a vendor or supplier of each of one or more hardware or software components in the information handling system;
   a respective identifier of a model or version of each of one or more hardware or software components in the information handling system;
   data indicating a current status of the battery; and
   data indicating a current operating mode of the information handling system.

5. The information handling system of claim 1, wherein the second trigger comprises:
   expiration of a timer;
   the first condition no longer being met;
   execution of a given program instruction in the information handling system;
   execution of a given program instruction in a system that is remote from the information handling system and is communicatively coupled to the information handling system;
   removal of a given component from the information handling system;
   a change in a configuration of components in the information handling system; or
   a change in an operating mode of the information handling system.

6. The information handling system of claim 1, wherein the instructions are further executable by the processor for, in response to detecting the second trigger:

capturing a second state of the information handling system; and writing data representing the second state of the information handling system to the power profile log.

7. A method for battery management unit based runtime monitoring of power consumption, comprising:

capturing a first state of the information handling system;

writing data representing the first state of the information handling system to a power profile log;

annotating the power profile log with a first identifier of a point in the power profile log at which data logging associated with the first condition begins;

obtaining, from the battery management unit, power data sampled by the battery management unit at a first rate based on the first condition, including data representing an amount of current flowing out of the battery or an amount of charge delivered by the battery;

writing at least a portion of the power data to the power profile log;

detecting a second trigger for ending the monitoring of power consumption in the information handling system in light of the first condition;

annotating the power profile log with a second identifier of a point in the power profile log at which data logging associated with the first condition ends;

generating, dependent on the annotations of the first and second identifiers in the power profile log, a first power profile report indicating power consumption associated with the first condition;

detecting a third trigger for monitoring power consumption in the information handling system in light of a second condition in the information handling system, wherein the third trigger is detected prior to detection of the second trigger, the second condition including transitioning the information handling system between a full-power operating mode and a low-power operating mode;

capturing a second state of the information handling system;

writing data representing the second state of the information handling system to the power profile log;

annotating the power profile log with a third identifier of a point in the power profile log at which data logging associated with the second condition begins;

obtaining, from the battery management unit and while obtaining of the power data at the first rate is concurrently in progress, additional power data sampled by the battery management unit at a second rate based on the second condition, the second rate differing from the first rate, including data representing an amount of current flowing out of the battery or an amount of charge delivered by the battery;

writing at least a portion of the additional power data to the power profile log;

detecting a fourth trigger for ending the monitoring of power consumption in the information handling system in light of the second condition;

annotating the power profile log with a fourth identifier of a point in the power profile log at which data logging associated with the second condition ends;

generating, dependent on the annotations of the third and fourth identifiers in the power profile log, a second power profile report indicating power consumption associated with the second condition; and in response to the first power profile and the second power profile, providing control signals to the battery to control the charging of the battery, wherein obtaining the power data that is sampled at the first rate and in light of the first condition overlaps in time with obtaining at least a portion of the additional power data that is sampled at the second rate and in light of the second condition.

8. The method of claim 7, wherein obtaining the power data comprises obtaining the power data from the battery management unit in real time as it is sampled by the battery management unit.

9. The method of claim 7, wherein the power data obtained from the battery management unit comprises sampled power data that has been aggregated by the battery management unit.

10. The method of claim 7, wherein the second trigger comprises:

expiration of a timer;

the first condition no longer being met;

execution of a given program instruction in the information handling system;

execution of a given program instruction in a system that is remote from the information handling system and is communicatively coupled to the information handling system;

removal of a given component from the information handling system;

a change in a configuration of components in the information handling system; or a change in an operating mode of the information handling system.

11. Non-transitory computer readable memory media storing instructions executable by a processor for:

capturing a first state of the information handling system;

writing data representing the first state of the information handling system to a power profile log;

annotating the power profile log with a first identifier of a point in the power profile log at which data logging associated with the first condition begins;

obtaining, from the battery management unit, power data sampled by the battery management unit at a first rate based on the first condition, including data representing an amount of current flowing out of the battery or an amount of charge delivered by the battery;

writing at least a portion of the power data to the power profile log;

detecting a second trigger for ending the monitoring of power consumption in the information handling system in light of the first condition;

annotating the power profile log with a second identifier of a point in the power profile log at which data logging associated with the first condition ends;

generating, dependent on the annotations of the first and second identifiers in the power profile log, a first power profile report indicating power consumption associated with the first condition;

detecting a third trigger for monitoring power consumption in the information handling system in light of a second condition in the information handling system, wherein the third trigger is detected prior to detection of the second trigger, the second condition including transitioning the information handling system between a full-power operating mode and a low-power operating mode;

capturing a second state of the information handling system;

writing data representing the second state of the information handling system to the power profile log;

annotating the power profile log with a third identifier of a point in the power profile log at which data logging associated with the second condition begins;

obtaining, from the battery management unit and while obtaining of the power data at the first rate is concurrently in progress, additional power data sampled by the battery management unit at a second rate based on the second condition, the second rate differing from the first rate, including data representing an amount of current flowing out of the battery or an amount of charge delivered by the battery;

writing at least a portion of the additional power data to the power profile log;

detecting a fourth trigger for ending the monitoring of power consumption in the information handling system in light of the second condition;

annotating the power profile log with a fourth identifier of a point in the power profile log at which data logging associated with the second condition ends;

generating, dependent on the annotations of the third and fourth identifiers in the power profile log, a second power profile report indicating power consumption associated with the second condition; and in response to the first power profile and the second power profile, providing control signals to the battery to control the charging of the battery, wherein obtaining the power data that is sampled at the first rate and in light of the first condition overlaps in time with obtaining at least a portion of the additional power data that is sampled at the second rate and in light of the second condition.

12. The non-transitory computer readable memory media of claim 11, wherein the second trigger comprises:

expiration of a timer;

the first condition no longer being met;

execution of a given program instruction in the information handling system;

execution of a given program instruction in a system that is remote from the information handling system and is communicatively coupled to the information handling system;

removal of a given component from the information handling system;

a change in a configuration of components in the information handling system; or a change in an operating mode of the information handling system.

* * * * *